United States Patent [19]

Bramhall, Jr.

[11] Patent Number: 4,948,074
[45] Date of Patent: Aug. 14, 1990

[54] FLUSH MOUNTED GAUGE FOR INSTRUMENT PANELS OF DIFFERENT THICKNESSES

[75] Inventor: Everett L. Bramhall, Jr., Manchester, N.H.

[73] Assignee: Crompton Modutec, Inc., Manchester, N.H.

[21] Appl. No.: 399,768

[22] Filed: Aug. 28, 1989

[51] Int. Cl.⁵ ............................................... G12B 9/00
[52] U.S. Cl. ...................................... 248/27.1; 73/431
[58] Field of Search ...................... 248/27.3, 27.1, 906; 361/427, 429; 174/53 G; 73/431; 200/296; 211/26

[56] References Cited

U.S. PATENT DOCUMENTS

| | | | |
|---|---|---|---|
| 447,129 | 2/1891 | Cooper | 248/27.1 X |
| 1,550,015 | 8/1925 | Decker | 248/27.1 X |
| 2,038,531 | 4/1936 | Bassett et al. | 248/27.1 X |
| 2,560,066 | 7/1951 | Batchelder | 248/27.1 X |
| 2,990,562 | 7/1961 | Bishop | 248/27.1 X |
| 3,599,910 | 8/1971 | Wipff | 248/27.1 |
| 4,070,559 | 1/1978 | Piber | 200/296 |
| 4,348,899 | 9/1982 | Muller | 73/431 |
| 4,685,035 | 8/1987 | Nonjoh | 361/429 |
| 4,732,281 | 3/1988 | Hall | 211/26 |

Primary Examiner—J. Franklin Foss
Attorney, Agent, or Firm—James & Franklin

[57] ABSTRACT

The cylindrical enclosure for the gauge mechanism includes a front portion with a transparent surface and a rearwardly extending side wall which terminates at an outwardly extending flange. One or more gaskets of appropriate aggregate thickness are selected and situated on the flange. The front portion fits snuggly into the panel opening with the gaskets adjacent the rear surface of the panel. The gaskets are selected such that the thickness of the panel plus the aggregate thickness of the gaskets equals the depth of the side wall. This results in the front surface of the gauge being coplanar with the front surface of the panel. In this manner, a single size gauge enclosure can be adapted to be flush mounted to panels having a range of different thicknesses.

10 Claims, 5 Drawing Sheets

FLUSH MOUNTED GAUGE FOR INSTRUMENT PANELS OF DIFFERENT THICKNESSES

The present invention relates to gauges for use with instrument panels such as those commonly employed on nautical or automotive vehicles and more particularly to a gauge enclosure adapted to be flush mounted on instrument panels of different thicknesses through the appropriate selection of gaskets employed as a spacer elements.

Gauges and precision panel meters of various sizes and types are used for many different applications including nautical and automotive vehicles and the like. For purposes of esthetics and safety, it is desirable to construct the gauges so that they can mount flush with the front surface of the panel.

Flush mounted gauges, which fit snuggly into panel openings, create an instrument panel with an esthetically pleasing appearance. Since the appearance of the instrument panel can contribute substantially to the overall attractiveness of the vehicle, panel designers often prefer to employ flush mounted gauges which have no visible mounting hardware.

Moreover, gauges which extend beyond of the panel surface can be dangerous. The protruding portion can cause injury in the event of an accident. It may also catch on clothing or similar articles causing damage. On the other hand, gauges which are set back into the instrument panel create a space within which dust and dirt may accumulate.

Given the desireability for flush mounted gauges, a gauge manufacturer and/or supplier is faced with the problem of manufacturing and/or stocking large numbers of different size gauges which can flush mount to panels which are available in many different thicknesses, for example in a range from 1/32 of an inch to ¼ of an inch thick. To accomodate all panel thicknesses, several different size gauges are required for each different type of gauge i.e. water temperature gauge, fuel gauge, oil pressure gauge etc. Accordingly, the gauge manufacturer and/or supplier must manufacture and/or stock a large number of different size gauges in each type to accomodate the requirements of all customers.

It is the general object of the present invention to eliminate the necessity for manufacturing and/or stocking large numbers of different size flush mountable gauges. This objective is accomplish through the selection of one or more gaskets of appropriate aggregate thickness and the use of same as spacer elements with gauges having a single size enclosure of a particular configuration. The gaskets are selected to have an aggregrate thickness which is a function of the thickness of the instrument panel in which the gauge will be mounted. By employing the appropriate gaskets for a given panel thickness, the same size enclosure can be used with panels of different thicknesses.

It is, therefore, a prime object of the present invention to provide a gauge which can be flush mounted to instrument panels of different thicknesses.

It is another object of the present invention to provide a flush mounted gauge for instrument panels of different thicknesses wherein different thickness gaskets are utilized to vary the spacing between the gauge flange and the rear surface of the panel.

It is another object of the present invention to provide a flush mounted gauge for instrument panels of different thicknesses which, by means of the appropriate selection of one or more inexpensive gaskets, can be adapted for use with instrument panels of different thicknesses.

In accordance with one aspect of the present invention, a gauge is provided for use with an instrument panel. The instrument panel is of the type having a front surface, a rear surface and an opening therethrough. The gauge comprises an enclosure for the gauge mechanism. The enclosure includes a transparent front surface defined by a side wall having a given depth which terminates at an outwardly extending flange. Gasket means are situated between the rear surface of the panel and the flange. The combined thickness of the panel and the gasket means is substantially equal to the depth of the enclosure side wall. Means are provided for fastening the flange and the gasket means to the rear surface of the panel such that the front surface of the gauge enclosure is substantially coplanar with the front surface of the panel.

The enclosure comprises a housing portion adapted to be mounted behind the panel and a cover portion adapted to be received within the panel opening. Means are provided for fastening the cover portion and the housing portion together.

The cover portion comprises the transparent front surface, the side wall and the flange. The housing portion also comprising a flange. The housing portion flange is preferably substantially co-extensive with the cover portion flange.

The opening in the panel has a given configuration and size. The side wall of the enclosure has a similar configuration and size and fits snuggly into the opening.

In accordance with another aspect of the present invention, a gauge is provided for use with a planar instrument panel of the type having front and rear surfaces and a substantially circular opening. The gauge comprises a cylindrical enclosure for the gauge mechanism. The enclosure has a wall and a flange extending from the wall in a direction substantially parallel to the panel. The enclosure also includes a cylindrical cover having a circular transparent front surface defined by an edge and a side wall extending from the edge in the direction substantially perpendicular to the panel. The outer dimension of the side wall and the inner dimension of the panel opening are substantially equal such that the cover fits snuggly into the opening. A flange extends outwardly from the cover side wall substantially parallel and adjacent to the enclosure flange. Annular gasket means are situated between the rear surface of the panel and the cover flange. The gaskets means and the panel have a combined dimension in a direction perpendicular to the panel substantially equal to that of the cover side wall such that the front cover surface is substantially coplanar with the front surface of the panel. Means are provided for fastening the housing flange, the cover flange and the gasket means to the rear surface of the panel.

In accordance with another aspect of the present invention, a method is disclosed for adapting a gauge enclosure for flush mounting on panels of different thicknesses. The enclosure has a side wall of a given depth terminating in a flange. The method comprises the steps of selecting one or more gaskets to form an element having an aggregate thickness which, when combined with the panel thickness, equals the side wall depth. The gasket element is situated between the flange and the rear of the panel. The flange and gasket element are then fastened to the rear of the panel.

To these and such other objects which may hereinafter appear, the present invention relates to a flush mounted gauge for instrument panels of different thicknesses, as described in detail in the following specification and recited in the annexed claims, taken together with the accompanying drawings wherein like numerals refer to like parts and in which:

The figures illustrate an planar instrument panel, generally designated 10, which includes a substantially planar front surface 12 and a substantially planar rear surface 14. Panel 10 may be made of any situatable material, such as wood, plastic or metal and may be designed for use in a vehicle or for any one of a large number of other applications. Panel 10 can be of any one of a variety of different thicknesses, preferably within the range of from 1/32 of an inch to ¼ of an inch thick.

Figure 1:
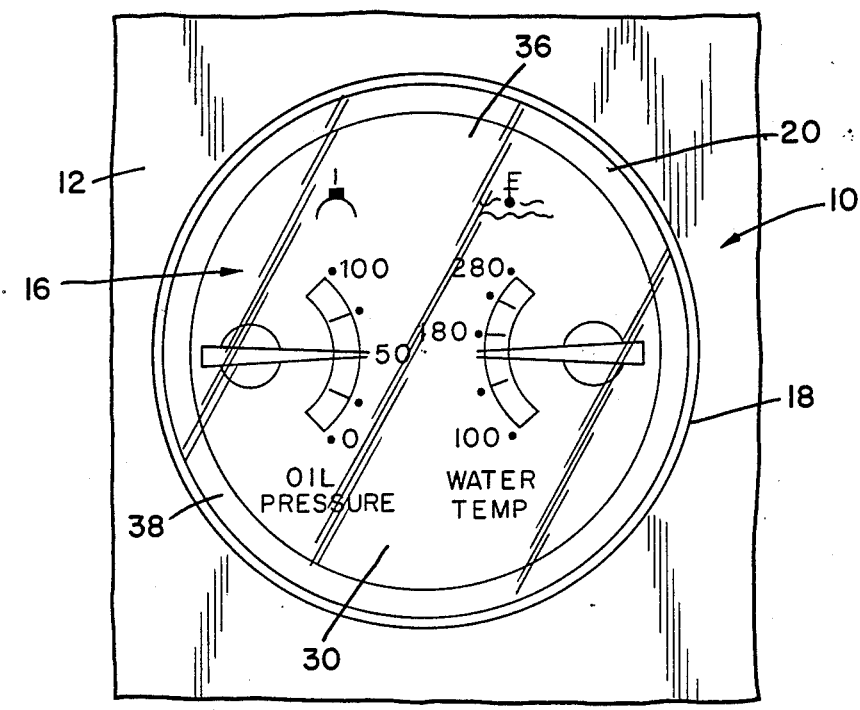
FIG. 1 is a plan view of a panel section showing the front of a gauge of the present invention which is mounted thereto.
Figure 2:
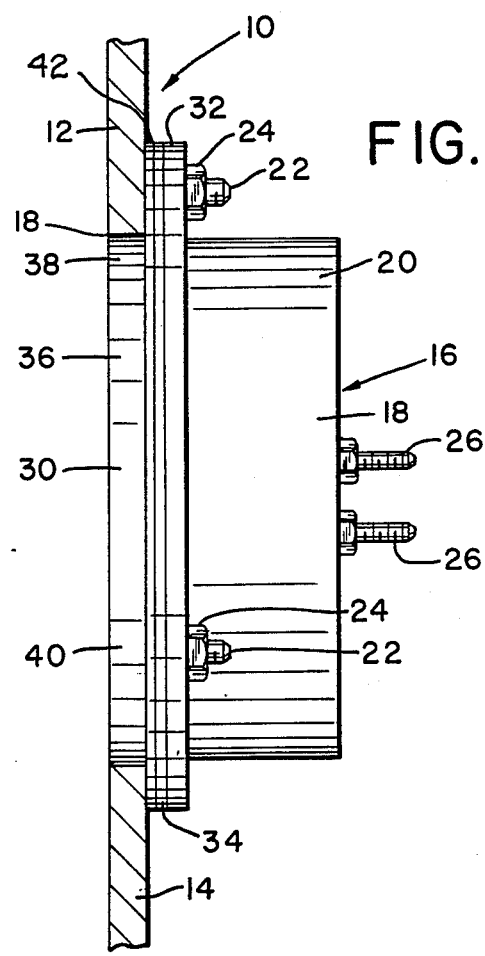
FIG. 2 is a side view of the gauge showing in FIG. 1.
Figure 3:
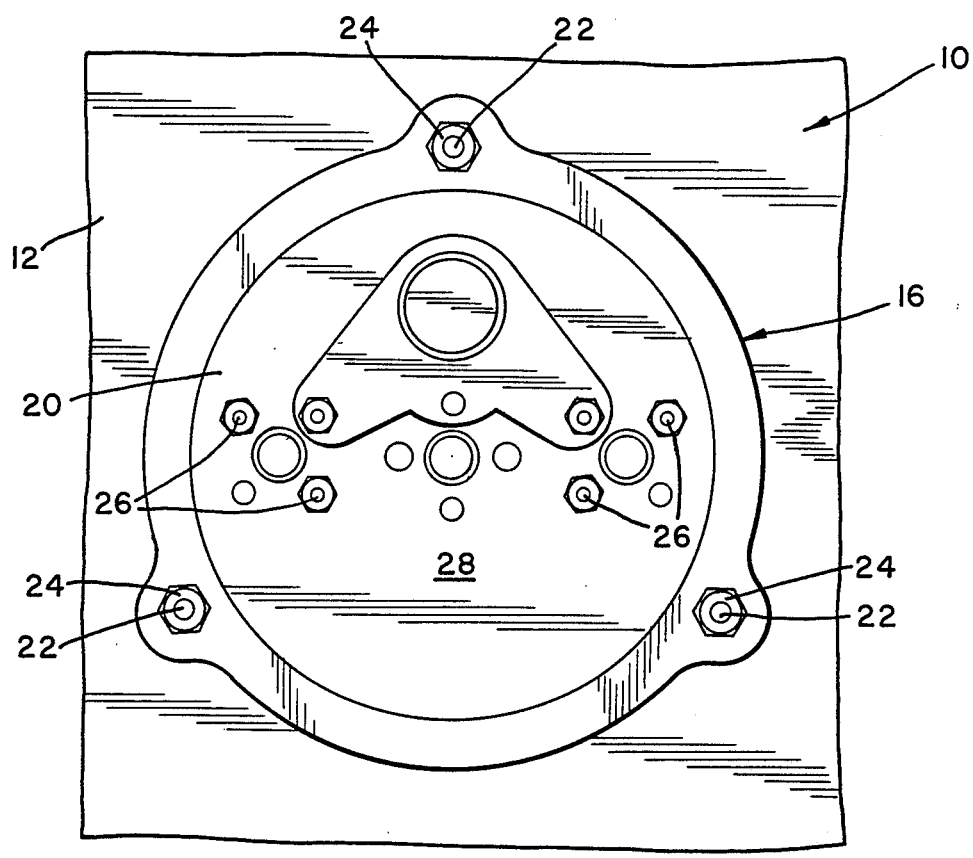
FIG. 3 is a rear view of the gauge illustrated in FIG. 1.
Figure 5:
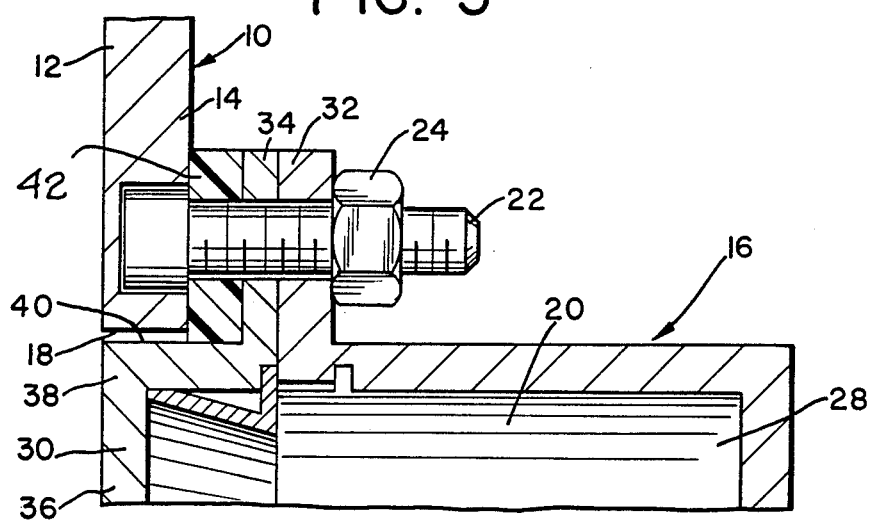
FIG. 5 is a enlarged fragmentary view of a portion of the gauge of the present invention illustrated in FIG. 4.

The gauge of the present invention, generally designated 16, is illustrated in FIG. 1 as a double gauge, including an oil pressure gauge and a water temperature gauge. However, the particular type of gauge involved and the internal gauge mechanism play no part in the present invention.

An opening 18 is created in panel 10. Opening 18 is shown as circular to accomodate a cylindrical gauge enclosure, for purposes of illustration. However, other configurations may be used. The inner diameter of opening 18 is substantially equal to the outer diameter of a substantially cylindrical enclosure 20 within which the gauge mechanism is situated. The gauge enclosure 20 fits snuggly within opening 18 in a manner depicted in FIG. 1.

Enclosure 20 is affixed to the rear surface 14 of panel 10 by bolts 22 which extend rearwardly from rear surface 14 in a direction substantially perpendicular thereto. Nuts 24 fit onto bolts 22 in customary fashion. The rear surface of gauge enclosure 20 is provided with electrical terminals 26 for each gauge mechanism.

Figure 4:
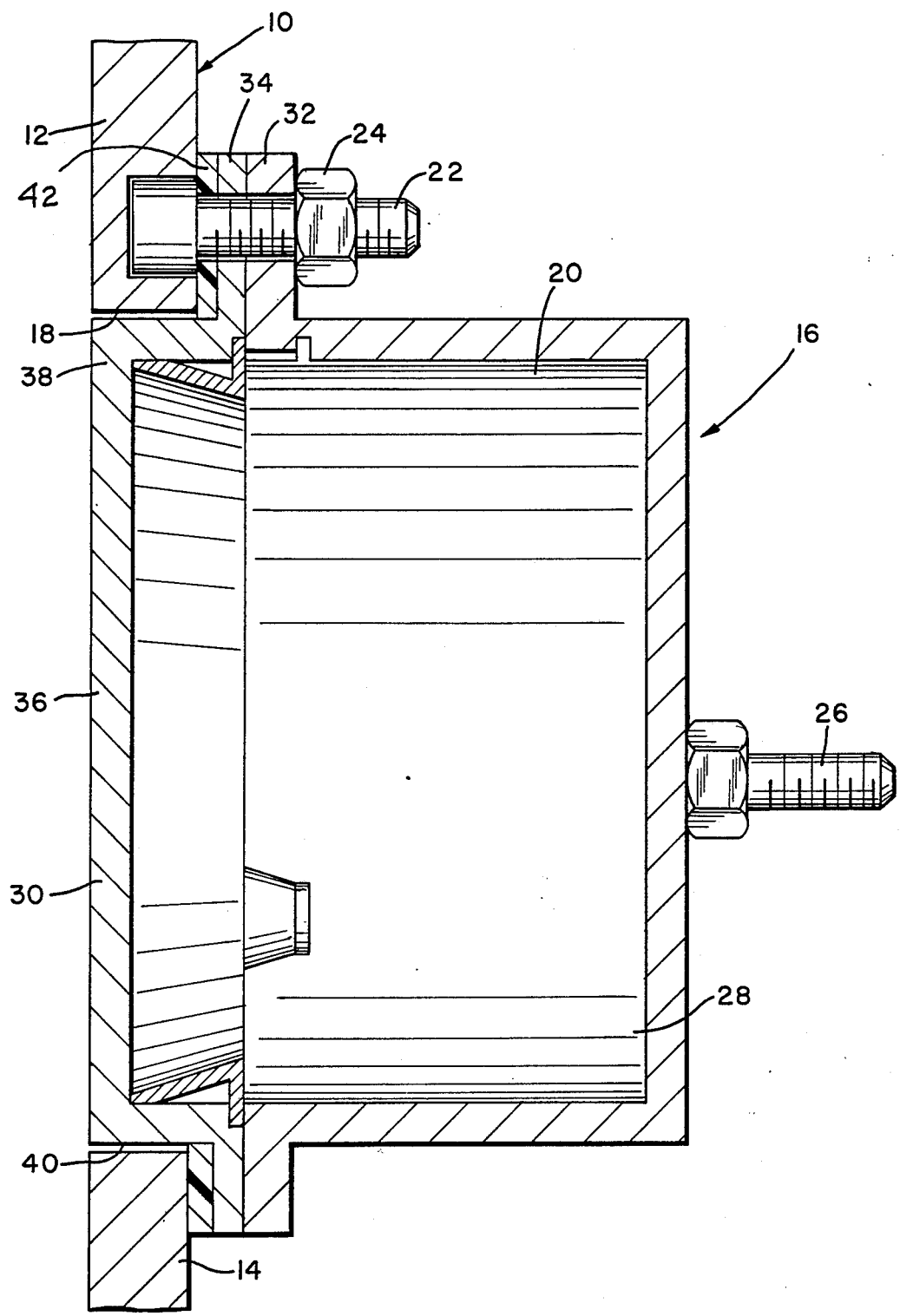
FIG. 4 is a enlarged cross-sectional view of the gauge of the present invention.

As best seen in FIG. 4, enclosure 20 includes a housing portion 28 which forms the rear portion of the enclosure and a cover portion 30 which comprises the front portion. Housing portion 28 is preferably substantially cylindrical and has at its forward end an outwardly extending, substantially annular flange 32. Cover portion 30 is also preferably substantially cylindrical and has at its rear edge an outwardly extending substantially annular flange 34 which is substantially co-extensive with and adjacent to flange 32.

Cover portion 30 has a transparent front section 36, through which the gauge face can be viewed. Front section 36 of cover portion 20 is defined by an opaque edge or rim 38 which is the end of a side wall 40. Side wall 40 is also substantially cylindrical and extends in a direction substantially perpendicular to the panel surfaces. The depth of side wall 40 is measured from the edge 38 rearwardly to point where the side wall meets flange 34.

One or more annular gaskets 42 (only one is shown) are selected for use as a spacer element to adapt the gauge enclosure for flush mounting on different size panels. Gaskets 42 may be made of any appropriate material such as rubber, plastic or metal. The gaskets are used in conjunction with the gauge enclosure 16 to adjust the effective depth of side wall 40 to accommodate panels of different thicknesses. Openings are provided in flange 32, flange 34 and gaskets 42 to accommodate bolts 22 such that tightening nuts 24 will serve to fasten the gaskets to the enclosure and fasten the assembly to the rear surface of panel 10.

In order for enclosure 16 to be mounted flush with panel 10, that is, for front surface 36 of cover portion 30 to be substantially coplanar with the front surface 12 of panel 10, it is necessary that the combined thickness of panel 10 and the aggregate thickness of gaskets 42 precisely equal the depth of side wall 40 of cover portion 30. This can be accomplished through the appropriate selection of the thickness of gaskets 42. Normally, only a single gasket may be required. However, for unusually thick instrument panels or panels with odd dimensions, several gaskets which have an aggregate, the required thickness may be used.

The gauge manufacturer and/or supplier may stock a number of gaskets of different thicknesses of the appropriate size for a particular enclosure configuration. Once the customer indicates the thickness of the panel in which the gauge will be mounted, the appropriate gasket or gaskets are selected and provided with the gauge. For example, if the depth of side wall 40 of the gauge enclosure is ⅜ inch and the panel is ¼ inch thick, then a gasket will be selected which is ⅛ inch thick. Accordingly, within a given range, a single size enclosure can be utilized with panels of many different thicknesses through the appropriate selection of gasket thickness. This permits a single enclosure size to be manufactured and stocked for use with panels of many different thicknesses.

It should now be appreciated that the present invention relates to a flush mounted gauge. The gauge enclosure is adapted for use with panels of different thicknesses by the use of a spacer element in the form of one or more gaskets with the appropriate aggregate thickness. Gaskets are chosen which have an aggregate thickness which, in combination with the panel thickness, equals the depth of the gauge enclosure side wall. Hence, a single enclosure size can be used with a variety of different panel thicknesses.

While only a single preferred embodiment of the present invention has been disclosed herein, it is obvious that many variations and modifications could be made therein. It is intended to cover all these variations and modifications which fall within the scope of the present invention, as defined by the following claims:

I claim:

1. A gauge for use with an instrument panel having a front surface, a rear surface, and an opening therethrough, the panel opening having a given shape and being of a given dimension, the gauge comprising an enclosure for the gauge mechanism, said enclosure comprising a front surface and a side wall having a given depth which terminates at an outwardly extending flange, said front surface having substantially said given shape and said given dimension so as to be adapted to fit snugly within the panel opening, gasket means situated between the rear surface of the panel and said flange, said gasket means having a central opening therein of substantially said given shape and dimension and being adapted to surround said side wall and substantially seal said flange to the rear surface of the panel, the combined thickness of the panel and the gasket means being substantially equal to said given depth and means for fastening said flange and said gasket means to the rear surface of the panel, such that said front surface of the gauge enclosure is substantially coplanar with the front surface of the panel.

2. The guage of claim 1 wherein said enclosure comprises a housing portion, a cover portion adapted to be situated within the panel opening comprising said front surface and means for fastening said cover portion and said housing portion together.

3. The guage of claim 2 wherein said cover portion comprises said side wall and said flange.

4. The gauge of claim 3 wherein said housing portion comprises a flange, said housing flange being substantially co-extensive with said cover flange.

5. The gauge of claim 1 wherein said gasket means comprises one or more gaskets.

6. The gauge of claim 1 wherein said gasket comprises a fastening means receiving opening therein.

7. The gauge of claim 4 wherein said gasket means comprises a fastening means receiving opening mean therein.

8. The gauge of claim 1 wherein said shape is circular.

9. A gauge for use with a planar instrument panel of the type having front and rear surfaces and a substantially circular opening of a given diameter, the gauge comprising a substantially cylindrical housing portion for the gauge mechanism having a wall extending in a direction substantially perpendicular to the panel and the flange extending from said wall in a direction substantially parallel to the panel, a substantially cylindrical cover portion having a transparent front surface, a side wall extending from said front surface in a direction substantially perpendicular to the panel, the outer dimension of said side wall and the inner dimension of the panel opening being substantially equal, such that said cover fits snugly into the panel opening, a flange extending outwardly from said cover wall substantially parallel to and adjacent said housing portion, one or more annular gaskets situated between the rear surface of the panel and said cover portion flange, said gaskets having a central circular opening therein of substantially said given diameter and being adapted to surround said cover side wall and to substantially seal said cover portion flange to the rear surface of the panel, said gaskets and the panel wall having a combined dimension in the direction perpendicular to the panel substantially equal to that of said cover portion side wall such that said front surface is substantially coplanar with the front surface of the panel and means for fastening said housing portion flange, said cover portion flange and said gasket to the rear surface of the panel.

10. The gauge of claim 9 wherein said gaskets comprises fastening means receiving openings therein.

* * * * *